Figure 1:
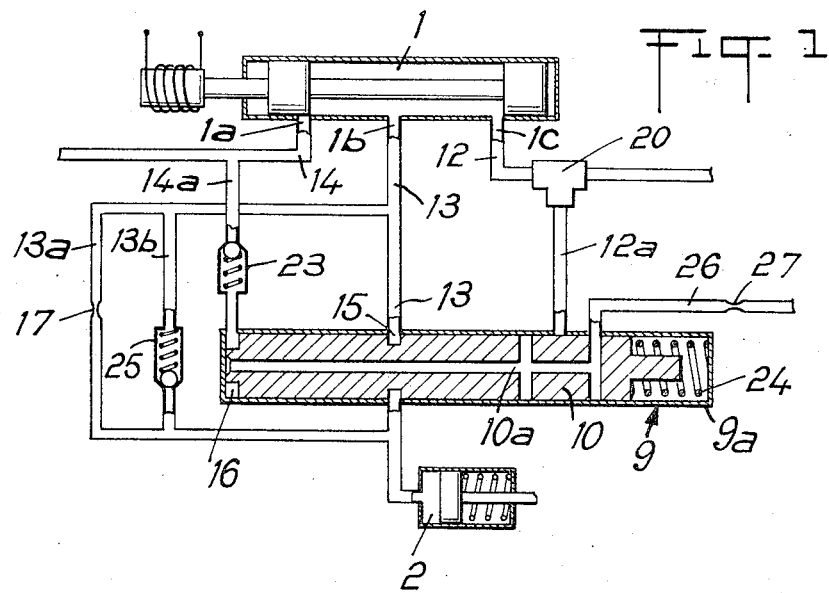

United States Patent [19]
Grosseau

[11] 3,851,929
[45] Dec. 3, 1974

[54] BRAKING MECHANISM TENDING TO ELIMINATE LOCKING

[75] Inventor: Albert Grosseau, Chaville, France

[73] Assignee: Societe Anonyme Automobiles Citroen, Paris, France

[22] Filed: Mar. 7, 1973

[21] Appl. No.: 339,007

[30] Foreign Application Priority Data
Mar. 9, 1972 France .................. 72.8305

[52] U.S. Cl. ............... 303/21 F, 188/181 A
[51] Int. Cl. ............................... B60t 8/02
[58] Field of Search ............ 303/21 F, 61–63, 303/68–69; 188/181

[56] References Cited
UNITED STATES PATENTS

| | | | |
|---|---|---|---|
| 3,549,212 | 12/1970 | Leiber | 303/21 F |
| 3,695,734 | 10/1972 | Hennig et al. | 303/21 F |
| 3,713,708 | 1/1973 | Michellone et al. | 303/21 F |
| 3,792,908 | 2/1974 | Brewster | 188/181 A |

Primary Examiner—Trygve M. Blix
Assistant Examiner—D. C. Butler
Attorney, Agent, or Firm—Marn & Jangarathis

[57] ABSTRACT

An anti-locking braking system for the wheel of a motor vehicle having a distributor with a slide which in one attitude permits fluid at full braking pressure to immediately enter the brake cylinder, but after a device detecting locking has operated so that the cylinder is exhausted, exhaust fluid is bled to the distributor to move the slide to a second attitude which routes the supply of pressurized fluid to the cylinder via a flow-limiter whereby the pressure rise in the cylinder increases progressively provided the brake pedal remains depressed.

8 Claims, 2 Drawing Figures

BRAKING MECHANISM TENDING TO ELIMINATE LOCKING

The invention relates to a braking mechanism tending to eliminate the locking of at least one wheel of a motor vehicle, operating according to the principle of exhausting the fluid under pressure contained in the brakes proper when a detection device indicates that locking is imminent.

In known manner, the pressure in the brake members must be restored progressively after the unlocking, since, if the grip has not developed favorably, a sudden rise in pressure may only cause a second rapid locking of the wheel which is once more rotating. Mechanisms capable of satisfying this requirement are also known, but they generally make use of complicated means and have numerous drawbacks both as regards their operation and in their construction.

The present invention thus proposes an improvement to such mechanisms in order to obviate these drawbacks making use of simple means for effecting the progressive rise in pressure in the braking receiving members.

Thus, the invention relates to a braking mechanism tending to eliminate the locking of at least one wheel of a vehicle, constituted by:
  a source of fluid under pressure controlled by the driver,
  members receiving said fluid connected to said wheel,
  a valve controlled by a device detecting the dynamic state of the wheel and able to connect said receiving members to an exhaust pipe.
  a first conduit which connects said source of fluid under pressure to said receiving members allowing a substantially free passage of the fluid and in which is located a distributor having two stable positions closing it in its second position as soon as the detection device registers an abnormal state of the wheel, which distributor remains in its position closing said conduit as long as the value of the pressure of the fluid coming from said controlled source has not decreased appreciably and opens it in its first position,
  a second conduit provided with a flow-limiter branched from the first said conduit on either side of said distributor.

In addition, the controlled valve, in manner known per se, comprises three connections and two positions.

Moreover, the portion of said first conduit, comprised between the source of fluid under pressure and the connection of the second conduit to said first conduit upstream of the distributor with respect to said source, is composed of two separate parts.

Each of the three said connections is connected respectively the first to the exhaust pipe, the second and third to the two aforesaid separate parts of the first conduit, whereas, in its first position, the controlled valve connects the two separate parts of the first conduit and isolates the exhaust pipe and, in its second position, said valve connects said exhaust pipe to the part of the first conduit connected to the distributor and isolates the part of the first conduit connected to the source of fluid under pressure.

One embodiment of the device also comprises a third conduit branched on either side of the flow-limiter in the second conduit, which third conduit is provided with a non-return valve allowing the passage of fluid in the direction of the receiving members towards the controlled valve.

In this embodiment, the distributor is constituted by a rigid cylindrical hollow body, by a slide mounted in said body, by spring means connected between the body and the said slide, whereas at least one chamber is defined by a first piston connected to the slide and is able to be connected to at least one source of fluid under pressure and the action of the fluid under pressure on said piston opposes that of the spring means and is greater than the latter when the fluid under pressure effectively fills the chamber. The slide is in its first position, allowing a free passage of the fluid into the first conduit, under the action of said spring means when the pressure of the fluid contained in the chamber is zero. Said slide is in its second position thus closing the passage of the fluid into the first conduit when the pressure of the fluid which is not zero contained in said chamber has an effect greater than the effect of the spring means.

According to another embodiment, the chamber defined by said piston is connected on the one hand to a branch of the exhaust pipe and on the other hand to a conduit connected to a branch of the part of the first conduit connected to the source of fluid under pressure by the intermediary of channels connected to the slide and the body of the distributor, when the slide is in its said second position, whereas a non-return valve is arranged in said branch of the exhaust pipe thus allowing the inlet of fluid into the chamber.

According to a variation of the above embodiment, in the said chamber, a second piston defines two chambers, connected to the first of which is a branch of the exhaust pipe, whereas the second, intermediate between the first and the second piston, is connected to a branch of the part of the first conduit connected to the source of fluid under pressure by means of channels connected to the slide and the body of the distributor, when the slide is in its second position.

Advantageously, in the first said position of the slider, a groove provided in said slide is connected to the apertures connecting the first conduit to the distributor.

Preferably, the said channels are inside the slide of the distributor and said channels are connected to a conduit returning to the exhaust when said slide is in its first position.

The invention will be better understood and secondary features as well as their advantages will be apparent from the description of an embodiment given hereafter as a non-limiting example.

Figure 2:
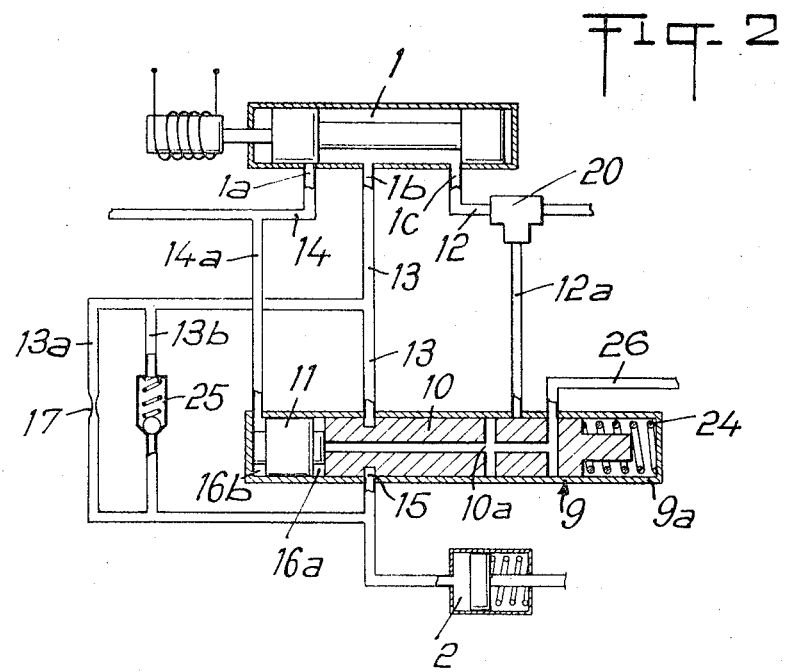

Reference will be made to the accompanying drawings in which:

FIG. 1 is a diagrammatic illustration of one embodiment of a device according to the invention, and, FIG. 2 is a diagram of a variation of the preceding embodiment.

If reference is made firstly to FIG. 1, a valve 1 is shown controlled by a device detecting the dynamic state of the wheel. The controlled valve 1 has three connections 1a, 1b and 1c which are connected respectively, the connection 1a to an exhaust pipe 14, the connection 1b to a pipe 13 the connection 1c to a pipe 12. The pipes 12 and 13 are the two separate parts of a first conduit connecting a source of fluid under pressure which is not shown, to receiving members connected to a wheel of the vehicle, represented by the brake cylinder 2. The part having the reference numeral 13 of the first conduit comprises a distributor 9, the slide 10 of which is slidably mounted in a cylindrical hollow body 9a. A compression spring 24 is placed between one end of the slide 10 and the body 9a, whereas a chamber 16 is defined by the other end of the slide, fulfilling the function of a piston, with the same body 9a, to which is connected a branch 14a of the exhaust pipe 14.

A non-return valve 23, allowing the inlet of fluid into the chamber 16, is connected to the branch 14a.

It will also be noted that the slide 10 has a groove 15 connected to the apertures connecting the conduit 13 to the distributor 9, under the action of the spring 24 when the pressure of the fluid contained in the chamber 16 is zero. Also the slide 10 is provided with internal channels 10a opening into the chamber 16, able to be connected selectively to a branch 12a of the part of the first conduit having the reference numeral 12 and to a conduit 26 returning to the exhaust. Advantageously, a restriction 27 is provided in the conduit 26. It is understood that this restriction may also be located in the channels 10a between the portion of said channels able to be connected to the conduit 12a and the pipe 26.

In the position illustrated in the figure, which corresponds to the position in which the conduit 13 is opened by the distributor 9, the channels 10a are connected to the conduit 26, whereas in the position where the conduit 13 is closed by the distributor 9, the spring 24 being compressed under the action of the pressure of the fluid contained in the chamber 16 by means of the spring 10 pushed towards the right, the channels 10a would be connected to the branch 12a for fluid under pressure.

In addition, a second conduit having the reference numeral 13a is branched on either side of the distributor 9 in the part having the reference numeral 13 of the first conduit. A flow-limiter 17 is disposed in this second conduit 13a. A third conduit 13b provided with a non-return valve 25 is branched on either side of the flow-limiter in the second conduit 13a. A filter 20, disposed at the junction of the conduits 12 and 12a prevents the admission into a device of this type of impurities detrimental to its operation.

In the variation illustrated in FIG. 2, certain of the parts abovedescribed designated by the same reference numerals are again shown. On the other hand, a second piston 11 is disposed in the chamber 16 thus defining two secondary chambers 16a and 16b. The branch 14a of the exhaust pipe 14 opens into the chamber 16b whereas the chamber 16a is able to be connected selectively to the branch 12a of the part of the first conduit 12 and to the conduit 26 returning to the exhaust as indicated with regard to FIG. 1 by means of channels 10a.

The explanation of the operation will reveal the advantages of an embodiment of this type and of its variations and will facilitate an understanding of the invention.

In FIG. 1, the distributor 10 is illustrated in its position opening the conduit 13 and the controlled valve 1 is in its position for connecting the two separate parts 12 and 13 of the first conduit. The fluid under pressure, coming from its source, may thus flow to the braking members 2, preferably through the two parts 12 and 13 of the first conduit via the filter 20, the controlled valve 1 and the groove 15 of the slide 10 connected to the first conduit, this path providing no appreciable resistance to the passage of fluid.

It will now be imagined that the distributor 10 is in its position closing the first conduit, the slide being pushed towards the right, the controlled valve 1 being as shown in FIG. 1. The fluid coming from the source of fluid under pressure may only reach the receiving members 2 through the branch 13a of the conduit 13, by way of the restriction 17. Also, the fluid under pressure is admitted to the chamber 16 due to the connection established in the vicinity of the slide 10 between the branch 12a of the conduit 12 and the channels 10a.

The passage from the open position to the closed position of the slide 10 of the distributor 9 requires an exhausting of the receiving members 2 in the vicinity of the controlled valve 1. This exhausting is effected by the detecting device when it records an abnormal sliding of the wheel for example. Under its control, the controlled valve 1 establishes a connection between the part of the first conduit 13 and the exhaust pipe 14 also closing the part of the first conduit having the reference numeral 12.

Thus, the fluid contained in the receiving members 2 may escape through the conduit 13 to the exhaust pipe 14 during a first period of time. It may do this particularly through the conduit 13b which is provided with the non-return valve 25 allowing passage in this direction.

The pipe 14 has a pressure drop sufficient in order that a counter-exhaust pressure appears therewithin. This counter pressure extends to all the exhaust circuit and in particular to the branch 14a of the pipe 14. Fluid is thus admitted at a certain pressure into the chamber 16 through the non-return valve 23. This fluid acts on the left-hand end of the slide 10 forming a piston and tends to push said slide towards the right. It also tends to escape through the channels 10a to the pipe 26 but the restriction 27, disposed in the latter, considerably retards this escape and makes the tendency of the fluid to push the slide 10 preponderant. This displacement towards the right of the slide 10 has the effect of cutting off the part of the first conduit with the reference numeral 13 and of cutting the connection between the channels 10a and the channel 26, whereas said displacement establishes a connection between the branch 12a and the channels 10a. Thus fluid coming from the source of fluid under pressure is admitted to the chamber 16 and is trapped in this chamber by the non-return valve 23. It will be noted that the slide 10 is thus maintained by this fluid in its position closing the first conduit 13. If a new exhausting of the fluid contained in the receiving members 2 is necessary, it thus takes place through the non-return valve 25 disposed in the conduit 13b. The passage from the closed position to the open position of the slide 10 may take place only when the pressure in the branch 12a has decreased appreciably, i.e., when the driver has ceased depressing the brake pedal. Under the action of the spring 24, the slide 10 may then return to its open position, the fluid contained in the chamber 16 escaping through the channels 10a and the pipe 26 to a fluid reservoir.

With regard to FIG. 2, when the slide 10 is in its position closing the first conduit 13, the fluid under pressure is admitted through the branch 12a and the inner channels 10a in the chamber 16a intermediate between the left-hand end forming the first piston of the slide 10 and the second piston 11. The said counter exhaust/pressure is received by the piston 11 in the chamber 16 which pushes back the slide 10. Connections, cut on the one hand and made on the other as aforedescribed allow the fluid coming from the source of fluid under pressure to keep the slide 10 in its closed position and to push the piston 11 towards the left. The latter isolates the chamber 16a from the branch 14a. It will be noted that the pipe 26 no longer comprises a restriction, since the piston 11 constantly isolates the fluid contained in the branch 14a from the pipe 26.

Thus a device of this type makes it possible to supply the braking members of a wheel with fluid under pressure by two paths. A first path, substantially free is used by the fluid when there has been no detection of locking. It is defined by the first conduit — the two parts 12 and 13 and the groove 15 of the slide 10. A second path is used by said fluid after a detection of locking. It is defined by the conduits 12,13a by way of the flow-limiter 17, the distributor 9 having closed the conduit 13. This second path will be used throughout the duration of the braking operation following the unlocking when the driver has not yet ceased to depress the brake pedal. It will thus be seen that a progressive increase in pressure in the braking members is ensured after their exhausting necessary for unlocking. This device has the advantage of using means of simple construction, whose operation, contrary to certain members such as valves which may bang against their seating, does not have uncontrollable risks.

The device according to the invention may be integrated in an advantageous manner in the braking equipment of motor vehicles. The invention is not limited to the detailed embodiment which has been described but on the contrary covers all variations which could be applied thereto without diverging from its framework or spirit.

What is claimed is:

1. An anti-locking braking assembly for a vehicle which comprises:
   a source of fluid under pressure;
   a receiving member means coupled to a brake of a wheel of said vehicle;
   a sensing means detecting the dynamic state of said wheel;
   a first conduit means including a control valve means responsive to said sensing means, said control valve means having an exhaust conduit means, said first conduit means capable of placing said receiving member means in fluid communication with said source of pressurized fluid via said control valve means;
   a distributor means having two positions, said distributor means being disposed in said first conduit means between said control valve means and said receiving member means and dividing said first conduit means into first and second portion means, said first portion means extending from said control valve means to said distributor means, said second portion means extending from said distributor means to said receiving member means, said distributor means comprising first and second guide means said first guide means enabling said distributor means to maintain a first stable position to provide fluid communication between said first and second portion means, said second guide means enabling said distributor to maintain a second stable position whereby fluid communication between said portion means is interrupted upon detection by said sensing means of an abnormal state of said wheel as long as the pressure of said fluid is not appreciably decreased; and
   a second conduit means including a fluid flow limiter means connecting said first and second portion means of said first conduit means in shunt relationship with respect to said distributor means.

2. The anti-locking braking assembly as defined in claim 1 including a third conduit means having a non-return valve means, said third conduit means connecting said second conduit means in shunt relationship with respect to said flow limiter means thereof to facilitate the passage of fluid from said receiving member means.

3. The anti-locking braking assembly as defined in claim 2 wherein said slide is provided with a groove to provide fluid communication between said first and second portions of said first conduit means when said slide is in said first position.

4. The anti-locking braking assembly as defined in claim 2 wherein said distributor means is comprised of a rigid cylindrical hollow body, a slide movably positioned therein, and a spring means disposed within said body between said body and said slide, said slide having a piston means defining a chamber with said body, said chamber being capable of being placed in fluid communication with a source of fluid under pressure, whereby the action of said fluid on said piston means is opposed to the compressional force of said spring means and whereby said chamber is filled with fluid when the pressure of fluid is greater than the compressional force of said spring means, said slide maintaining a first position to permit the passage of fluid between said first and second portion means when the pressure of fluid in said chamber is less than the compressional force of said spring, said slide maintaining a second position to interrupt fluid communication between said first and second portion means when the pressure of fluid in said chamber is greater than the compressional force of said spring means.

5. The anti-locking braking assembly as defined in claim 4 wherein a second piston means is provided to define a second chamber and wherein said slide is formed with channel means, said first chamber being in fluid communication with said exhaust conduit means by a fourth conduit means including a non-return valve means, when said slide is in said first position, and wherein said second chamber is in fluid communication with said first conduit means by said channel means when said slide is in said second position.

6. The anti-locking braking assembly as defined in claim 5 wherein said channels are in fluid communication with a second exhaust conduit means including a flow limiting means when said slide is in said first position.

7. The anti-locking braking assembly as defined in claim 4 wherein said slide is formed with channel means, said chamber being in fluid communication with said exhaust conduit means by a third conduit means including a non-return valve means and with said first conduit means by said channel means when said slide is in said second position.

8. The anti-locking braking assembly as defined in claim 7 wherein said channels are in fluid communication with a second exhaust conduit means including a flow limiting means when said slide is in said first position.

* * * * *

UNITED STATES PATENT OFFICE
CERTIFICATE OF CORRECTION

Patent No. 3,851,929    Dated December 3, 1974

Inventor(s) ALBERT GROSSEAU

It is certified that error appears in the above-identified patent and that said Letters Patent are hereby corrected as shown below:

Column 6, line 20, "2" should be --4--;

Claim 5 should read as follows:
--The anti-locking braking assembly as defined in Claim 4 wherein said slide is formed with channel means and wherein a second piston means is provided to define, in said chamber, two sub-chambers, said first sub-chamber being in fluid communication with said exhaust conduit means by a fifth conduit means, and wherein said second sub-chamber is in fluid communication with said first conduit means by said channel means when said slide is in said second position. -- line 54, "5" should be --7--;
    line 61, "said" should be -- and-- and "third" should be --fourth--; and
    line 65, "7" should be --6--.

Signed and Sealed this second Day of September 1975

[SEAL]

Attest:

RUTH C. MASON
Attesting Officer

C. MARSHALL DANN
Commissioner of Patents and Trademarks